(12) United States Patent
Itsukaichi et al.

(10) Patent No.: US 10,611,031 B2
(45) Date of Patent: Apr. 7, 2020

(54) ROBOT SYSTEM

(71) Applicant: Fanuc Corporation, Yamanashi (JP)

(72) Inventors: Takashi Itsukaichi, Yamanashi (JP); Naoto Inoue, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 8 days.

(21) Appl. No.: 16/003,533

(22) Filed: Jun. 8, 2018

(65) Prior Publication Data

US 2019/0009413 A1    Jan. 10, 2019

(30) Foreign Application Priority Data

Jul. 4, 2017    (JP) .................. 2017-131328

(51) Int. Cl.
*B23K 9/127* (2006.01)
*B25J 9/16* (2006.01)

(52) U.S. Cl.
CPC .......... *B25J 9/1692* (2013.01); *B25J 9/1638* (2013.01); *B25J 9/1694* (2013.01); *G05B 2219/37351* (2013.01); *G05B 2219/39195* (2013.01)

(58) Field of Classification Search
CPC ...... B25J 9/1638; B25J 9/1692; B25J 9/1694; G05B 2219/37351; G05B 2219/39195
USPC ........ 700/254; 901/2, 9, 19, 30; 318/568.22, 318/400.37
See application file for complete search history.

(56) References Cited

U.S. PATENT DOCUMENTS

| | | |
|---|---|---|
| 5,761,940 A | 6/1998 | Moore, Jr. et al. |
| 5,987,958 A | 11/1999 | Moore, Jr. et al. |
| 6,092,678 A | 7/2000 | Kawano et al. |
| 6,292,716 B1 | 9/2001 | Moore, Jr. et al. |
| 9,498,231 B2 * | 11/2016 | Haider ............... A61B 17/1703 |

(Continued)

FOREIGN PATENT DOCUMENTS

| | | |
|---|---|---|
| CN | 101389285 A | 3/2009 |
| CN | 102303315 A | 1/2012 |

(Continued)

OTHER PUBLICATIONS

Japanese Patent Office; Decision to Grant a Patent and Memorandum Thereof for Japanese Application No. 2017-131328; dated Jun. 20, 2019; 7 pages.

(Continued)

*Primary Examiner* — Dalena Tran (74) *Attorney, Agent, or Firm* — Winstead PC (57) ABSTRACT

A robot system 1 including: a robot; a control device which controls the robot; an elongated member attached to a distal end of the robot; a light projection unit attached to one end of the elongated member for emitting light in a longitudinal direction of the elongated member; a plurality of light reception units, arranged at the other end side of the elongated member, configured to receive the light emitted by the light projection unit; and a timer configured to measure time that is necessary for one of the light reception units to receive the light twice, where the control device controls the robot so as to slightly move a proximal end portion of the elongated member in a vibration movement direction of a distal end portion of the elongated member, based on the measured time and an order of light reception by the light reception units.

6 Claims, 9 Drawing Sheets

(56) References Cited

U.S. PATENT DOCUMENTS

| | | | |
|---|---|---|---|
| 2013/0253387 A1* | 9/2013 | Bonutti | A61H 23/0245 |
| | | | 601/46 |
| 2014/0138012 A1 | 5/2014 | Spicer et al. | |
| 2014/0169967 A1* | 6/2014 | Wilkins | B64C 27/16 |
| | | | 416/31 |
| 2014/0277740 A1 | 9/2014 | Adelman | |

FOREIGN PATENT DOCUMENTS

| | | |
|---|---|---|
| CN | 103817427 A | 5/2014 |
| JP | S63-155203 A | 6/1988 |
| JP | H04-294984 A | 10/1992 |
| JP | H05318345 A | 12/1993 |
| JP | H06-022995 U | 3/1994 |
| JP | H11-310388 A | 11/1999 |
| JP | H11-349280 A | 12/1999 |
| JP | 2002134583 A | 5/2002 |
| JP | 2006-218542 A | 8/2006 |
| WO | WO-9614949 A2 | 5/1996 |
| WO | WO-2007098494 A1 | 8/2007 |

OTHER PUBLICATIONS

Japan Patent Office, Office Action dated Apr. 16, 2019 for Japan Application No. 2017-131328.

* cited by examiner

D2 D1 D3
■ □ □
ON OFF OFF

ROBOT SYSTEM

CROSS-REFERENCE TO RELATED APPLICATIONS

This application is based on and claims priority to Japanese Patent Application No. 2017-131328 filed on Jul. 4, 2017, the entire content of which is incorporated herein by reference.

TECHNICAL FIELD

The present invention relates to a robot system.

BACKGROUND ART

Conventionally, there is known a robot which suppresses vibration of a distal end of a flexible arm by capturing a target line disposed at the distal end of the flexible arm by a camera disposed at a proximal end of the flexible arm, detecting a position of the target line by performing image processing on an acquired image, and driving a drive unit connected to the proximal end of the flexible arm according to a movement speed of the target line (for example, see PTL 1).

CITATION LIST

Patent Literature

{PTL 1}

Japanese Unexamined Patent Application, Publication No. Hei 5-318345

SUMMARY OF INVENTION

An aspect of the present disclosure provides a robot system including: a robot, a control device configured to control the robot, an elongated member attached to a distal end of the robot, the elongated member having a tool attached to a distal end of the elongated member, a light projection unit attached to one end of the elongated member, for emitting light along a longitudinal direction of the elongated member, a plurality of light reception units arranged at the other end side of the elongated member, in a direction intersecting the longitudinal direction of the elongated member configured to receive the light emitted by the light projection unit, and a timer configured to measure a time necessary for at least one of the plurality of light reception units to receive the light twice, where the control device controls the robot to slightly move a proximal end portion of the elongated member in a movement direction of vibration of a distal end portion of the elongated member, based on the time measured by the timer and an order of light reception by the plurality of light reception units that receive the light in order.

DESCRIPTION OF EMBODIMENTS

Hereinafter, a robot system 1 according to an embodiment of the present invention will be described with reference to the drawings.

Figure 1:
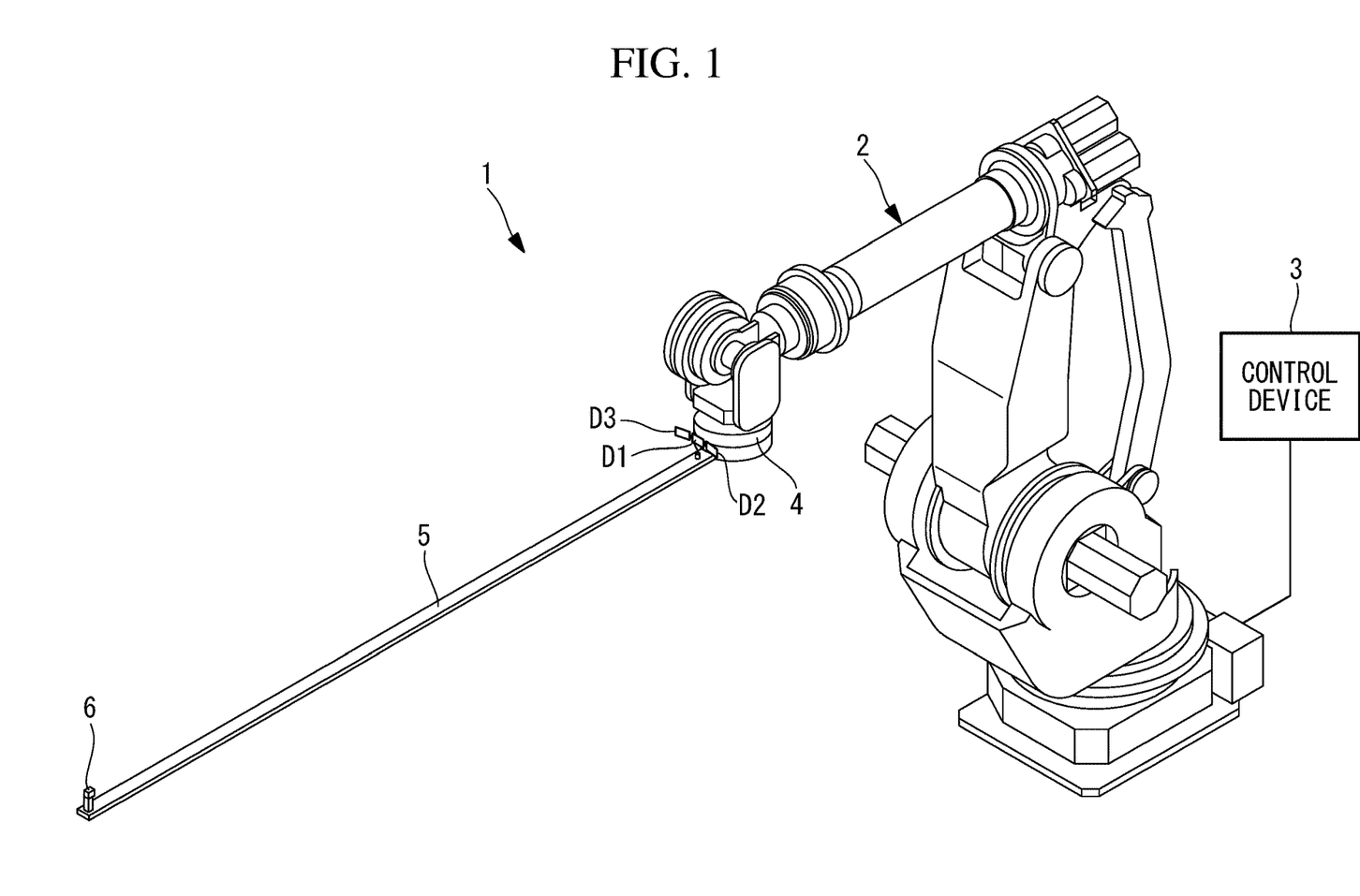
FIG. 1 is an overall configuration diagram showing a robot system according to an embodiment of the present invention.

As shown in FIG. 1, a robot system 1 according to the present embodiment includes a 6-axis articulated robot 2, a control device 3 for controlling the robot 2, an elongated member 5 attached to a distal end of a wrist 4 of the robot 2, a light projection unit 6 which is attached to a distal end of the elongated member 5 and which is for emitting light in a longitudinal direction of the elongated member 5, and light reception units D1, D2, D3 which are disposed at a proximal end of the elongated member 5 and which are for receiving light from the light projection unit 6.

A tool (not shown) for performing a task, such as welding, on a workpiece is fixed to the distal end of the elongated member 5. The elongated member 5 has sufficient rigidity for supporting the tool, and also has flexibility, and the distal end is easily vibrated, due to flexibility, at a time when the position of the tool is changed by operation of the robot 2.

The light projection unit 6 is a light source which emits light with high directivity, such as laser light.

Figure 2A:
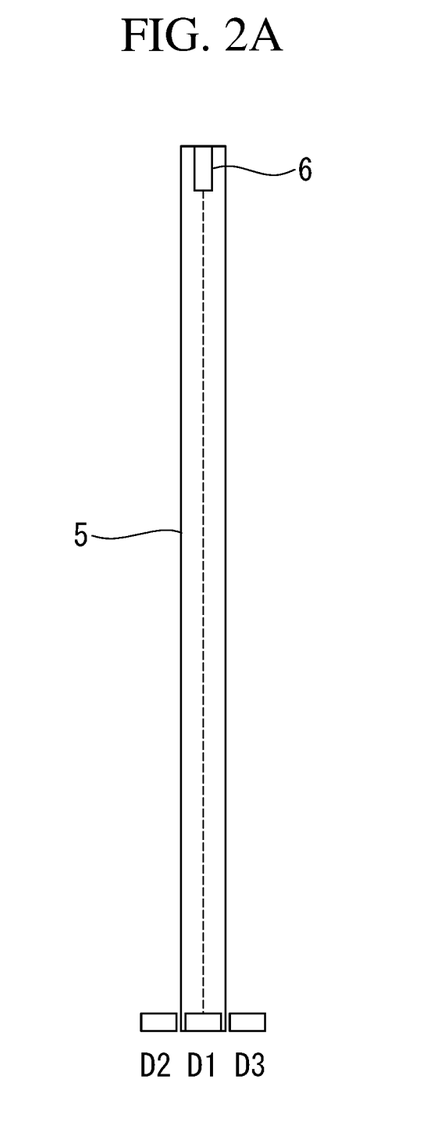
FIG. 2A is a diagram showing an arrangement of an elongated member, a light projection unit, and light reception units attached to a distal end of a wrist of a robot of the robot system in FIG. 1.
Figure 2B:
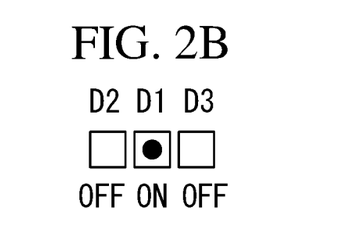
FIG. 2B is a diagram showing a state where light is detected by a center light reception unit.

The light reception units D1, D2, D3 are each a sensor which outputs an ON signal when there is incidence of light, and outputs an OFF signal where there is no incidence of light. In the example shown in FIG. 1, the light reception units D1, D2, D3 are provided at three positions next to one another in a horizontal direction. That is, as shown in FIGS. 2A, 2B, the three light reception units D1, D2, D3 are a light reception unit (hereinafter referred to also as "center light reception unit D1") D1 at the center position which receives light emitted from the light projection unit 6 in a state where the elongated member 5 is not vibrating, and two light reception units (hereinafter referred to also as "left light reception unit D2" and "right light reception unit D3") D2, D3 which are disposed on both sides of the light reception unit D1 in the horizontal direction.

The control device 3 causes the robot 2 to operate, according to an operation program taught in advance, and also, receives signals from the three light reception units D1, D2, D3 and causes the robot 2 to perform a vibration suppression operation.

Figure 5:
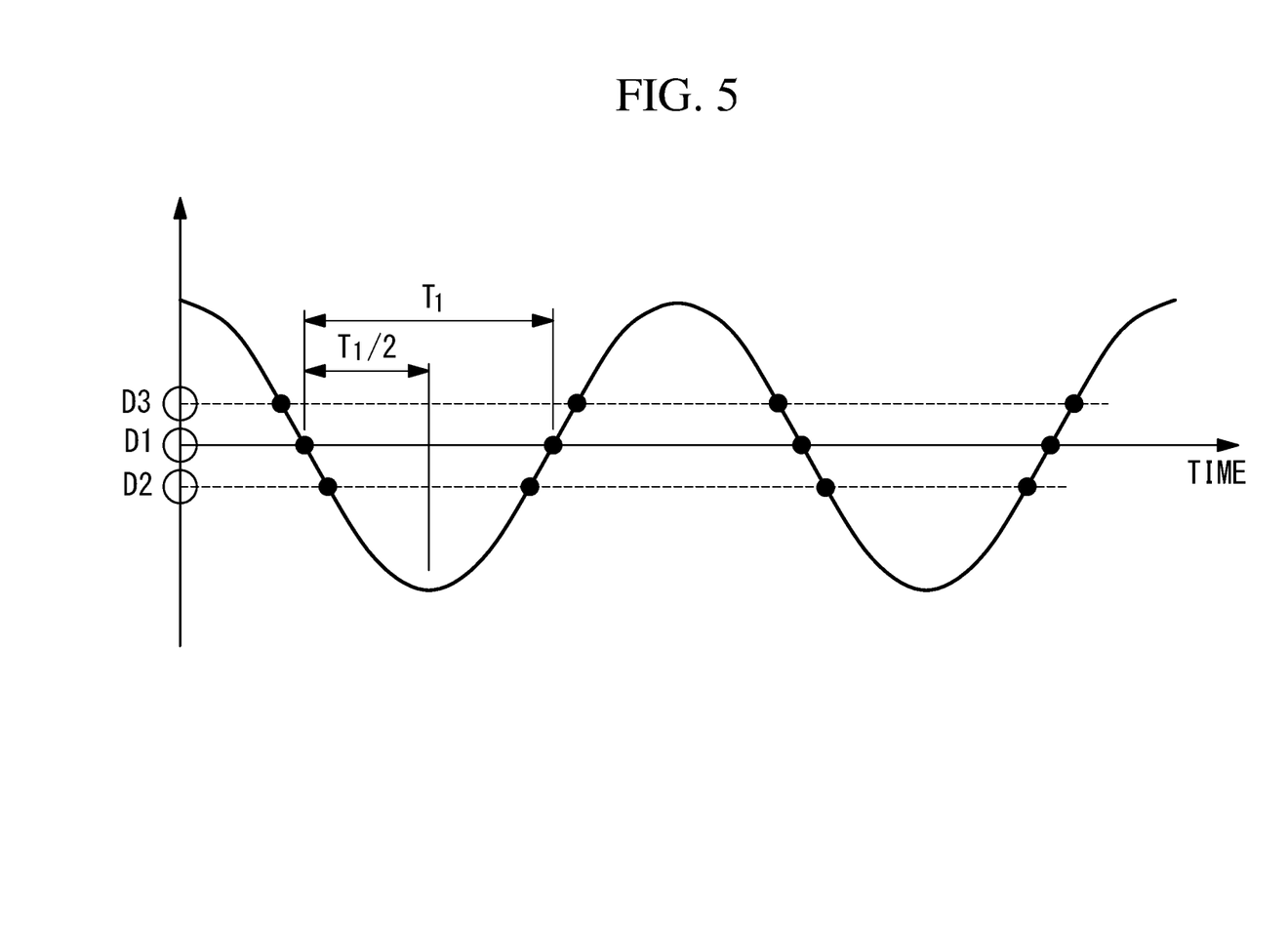
FIG. 5 is a diagram showing an example of timings of detection by the light reception units of the robot system in FIG. 1, and a vibration waveform of a distal end of the elongated member.

Specifically, the control device 3 is provided with a timer (not shown). As shown in FIG. 5, the timer measures a time T1 which is necessary for the center light reception unit D1 to receive light twice. The control device 3 calculates, based on the time T1 measured by the timer, a time (first time) T1/2 from when vibration of the elongated member 5 is at a center to when the vibration reaches maximum amplitude.

Furthermore, the control device 3 detects a direction of displacement caused by vibration of the distal end of the elongated member 5, based on an order of light reception by the three light reception units D1, D2, D3. Moreover, the control device 3 stores, for the vibration suppression operation, a minute movement for translating the wrist 4 in the horizontal direction, and a time (second time) T2 which is necessary for the minute movement.

Then, when the time T1, which is necessary for the center light reception unit D1 to receive light twice, is measured by the timer, the control device 3 waits for a difference time T3 obtained by subtracting the second time T2 from the first time T1/2, and then, causes the proximal end of the elongated member 5 to move slightly, by causing the wrist 4 to slightly move in a same direction as the direction of displacement which is caused by vibration of the distal end of the elongated member 5 and which is detected based on the order of light reception by the light reception units D1, D2, D3.

That is, when the time T1, which is necessary for the center light reception unit D1 to receive light twice, is measured, a cycle of vibration of the distal end of the elongated member 5 can be calculated, and the first time T1/2 that is taken to reach the maximum amplitude from a center of vibration of the distal end of the elongated member 5 can be calculated. When the maximum amplitude is reached, a speed of the distal end of the elongated member 5 becomes zero, and thus, minute movement of the proximal end of the elongated member 5 in the same direction as the direction of displacement of the distal end is completed at the timing.

An advantageous effect of the robot system 1 according to the present embodiment configured in the above manner will be described below.

With the robot system 1 according to the present embodiment, a vibration suppression operation is performed in a state where the elongated member 5 is disposed, by operation of the robot 2, at a position where vibration is desired to be suppressed. Examples of the state where vibration is desired to be suppressed may include, a case where the elongated member 5 is to be inserted into a small space, and a case where a task is to be performed by a tool attached to the distal end of the elongated member 5.

Figure 7:
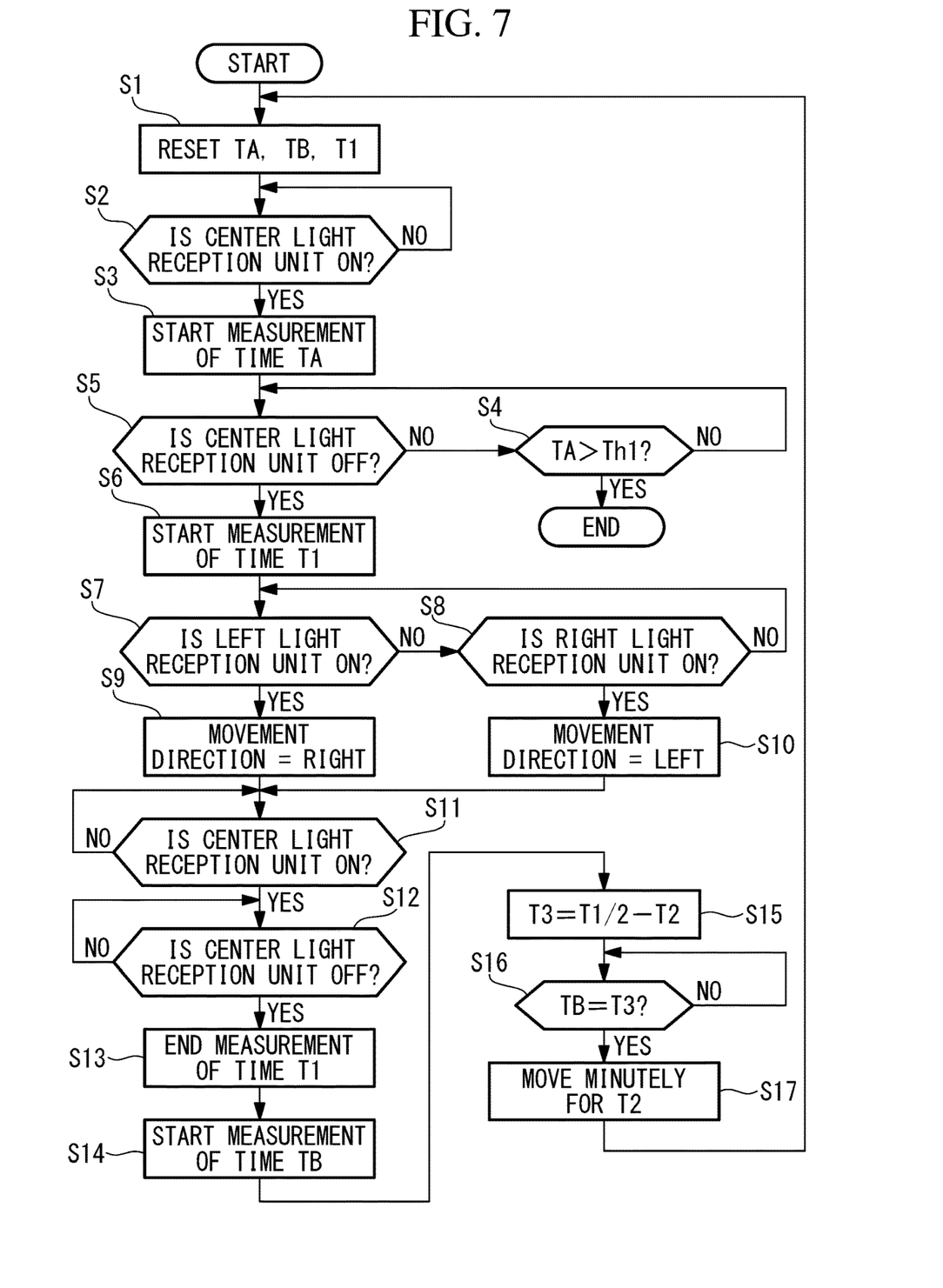
FIG. 7 is a flowchart describing a vibration suppression operation of the robot system in FIG. 1.

As shown in FIG. 7, in the vibration suppression operation, first, the timer of the control device 3 is reset (step S1), and whether or not light is detected (i.e., whether it is in an ON state or not) by the center light reception unit D1, among the three light reception units D1, D2, D3, is determined (step S2). In the case where there is no detection, the timer waits until there is detection, and in the case where there is detection, measurement of a time TA by the timer is started (step S3). The time TA is a time used in step S4 to determine that vibration suppression is complete, in the case where a time when the center light reception unit D1 is in the ON state is greater than a predetermined threshold Th1.

After measurement of the time TA is started, whether or not detection of light by the center light reception unit D1 is ended (i.e., whether it is in an OFF state or not) is determined (step S5), and in the case where detection is not ended, whether or not the ON state is continuing longer than the threshold Th1 is determined (step S4), and if the ON state is not continuing longer than the threshold Th1, steps are repeated from step S5.

When detection of light by the center light reception unit D1 is ended, measurement of the time T1 by the timer is instantly started (step S6). Then, whether or not light is detected by the light reception unit on either side among the three light reception units D1, D2, D3, such as the left light reception unit D2, is determined (step S7), and in the case where there is no detection, whether or not light is detected by the right light reception unit D3 is determined (step S8). If there is no detection in either case, steps are repeated from step S7 until there is detection.

Figure 3A:
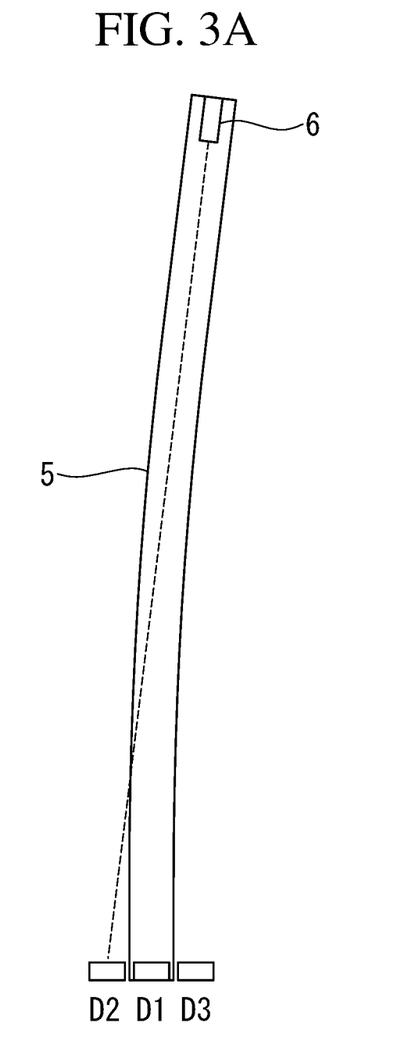
FIG. 3A is a diagram showing an arrangement of the elongated member, the light projection unit, and the light reception units in a state where the elongated member in FIG. 2A is curved to the right.
Figure 3B:
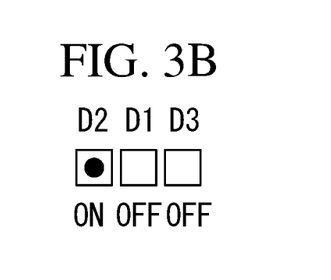
FIG. 3B is a diagram showing a state where light is detected by a left light reception unit.
Figure 4A:
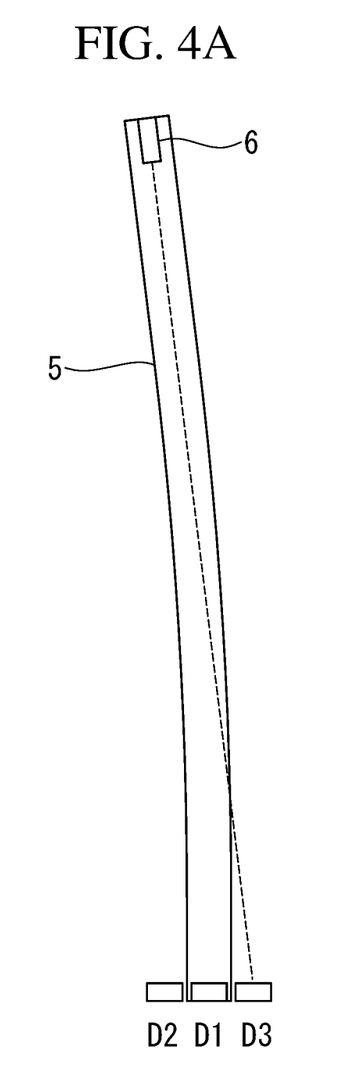
FIG. 4A is a diagram showing an arrangement of the elongated member, the light projection unit, and the light reception units in a state where the elongated member in FIG. 2A is curved to the left.
Figure 4B:
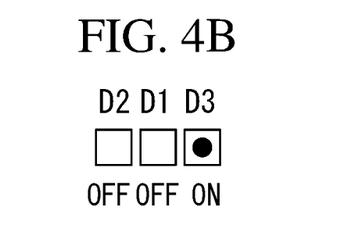
FIG. 4B is a diagram showing a state where light is detected by a right light reception unit.

In step S7, in the case where light is detected by the left light reception unit D2, as shown in FIG. 3B, the distal end of the elongated member 5 is displaced to the right, as shown in FIG. 3A, and thus, a movement direction of the minute movement is set to "right" (step S9). Moreover, in step S8, in the case where light is detected by the right light reception unit D3, as shown in FIG. 4B, the distal end of the elongated member 5 is displaced to the left, as shown in FIG. 4A, and thus, the movement direction of the minute movement is set to "left" (step S10).

Then, the control device waits until light is detected again by the center light reception unit D1 (step S11), and after the light is received, whether or not reception of the light is ended is determined (step S12), and measurement of the time T1 by the timer is ended at the timing of end of reception of the light (step S13). At the same time, measurement of a time TB by the timer is started (step S14).

Then, the difference time T3 is calculated by using the measured time T1 and the time T2 set in advance (step S15). The control device waits until the time TB becomes equal to the difference time T3 (step S16). Then, at a time point when the time TB becomes equal to the difference time T3, the robot 2 causes the proximal end of the elongated member 5 to move minutely for the time T2 in the movement direction set in step S9 or step S10 (step S17), and steps are repeated from step S1.

Figure 6A:
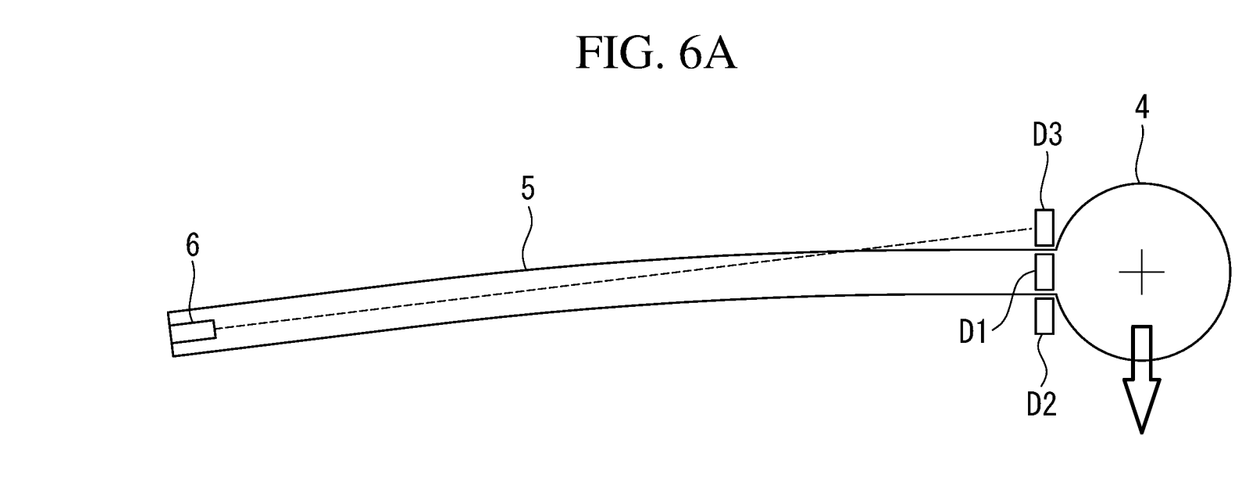
FIG. 6A is a diagram showing a state where the elongated member is curved due to vibration, and a direction of minute movement.
Figure 6B:
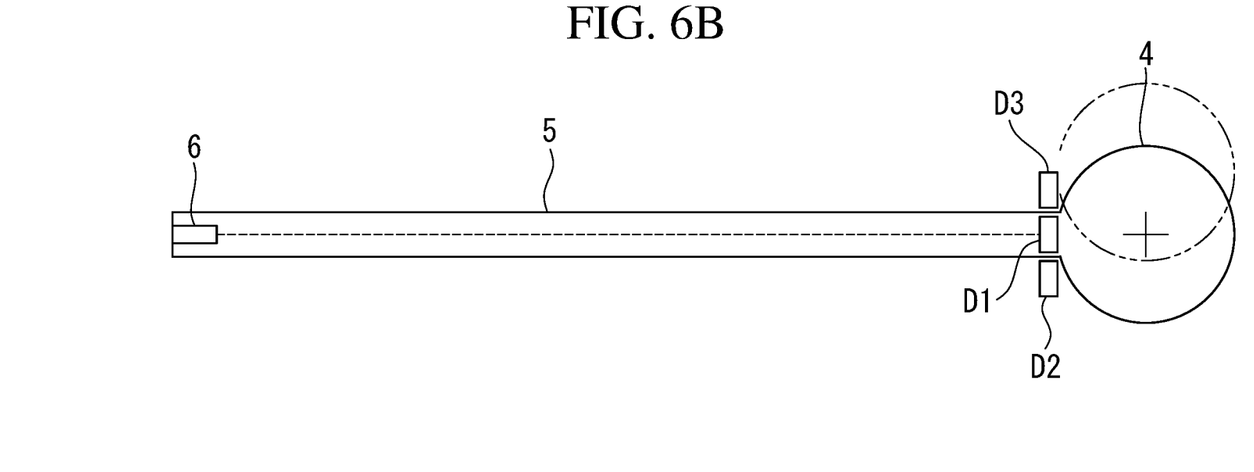
FIG. 6B is a diagram showing a state where the vibration is suppressed by the minute movement.

When minute movement is performed for the time T2 after the lapse of the time T3 from a time point of detection of light by the center light reception unit D1, the distal end of the elongated member 5 reaches the maximum amplitude at a time point of end of the minute movement. Accordingly, by moving the proximal end of the elongated member 5 in the manner shown by an arrow in FIG. 6A at a time point when the distal end of the elongated member 5 reaches the maximum amplitude and speed becomes zero, curving of the elongated member 5 is cancelled, as shown in FIG. 6B, and energy of vibration due to flexibility of the elongated member 5 may be reduced, and vibration of the distal end of the elongated member 5 may be easily suppressed.

The vibration suppression operation is repeated until detection of light by the center light reception unit D1 continues for more than the predetermined time Th1 in step S4, and thus, vibration of the distal end of the elongated member 5 may be sufficiently reduced.

That is, the robot system 1 according to the present embodiment achieves an advantageous effect that vibration of the distal end of the elongated member 5 may be easily suppressed, without performing complex calculation such as image processing and calculation of speed.

Figure 8:
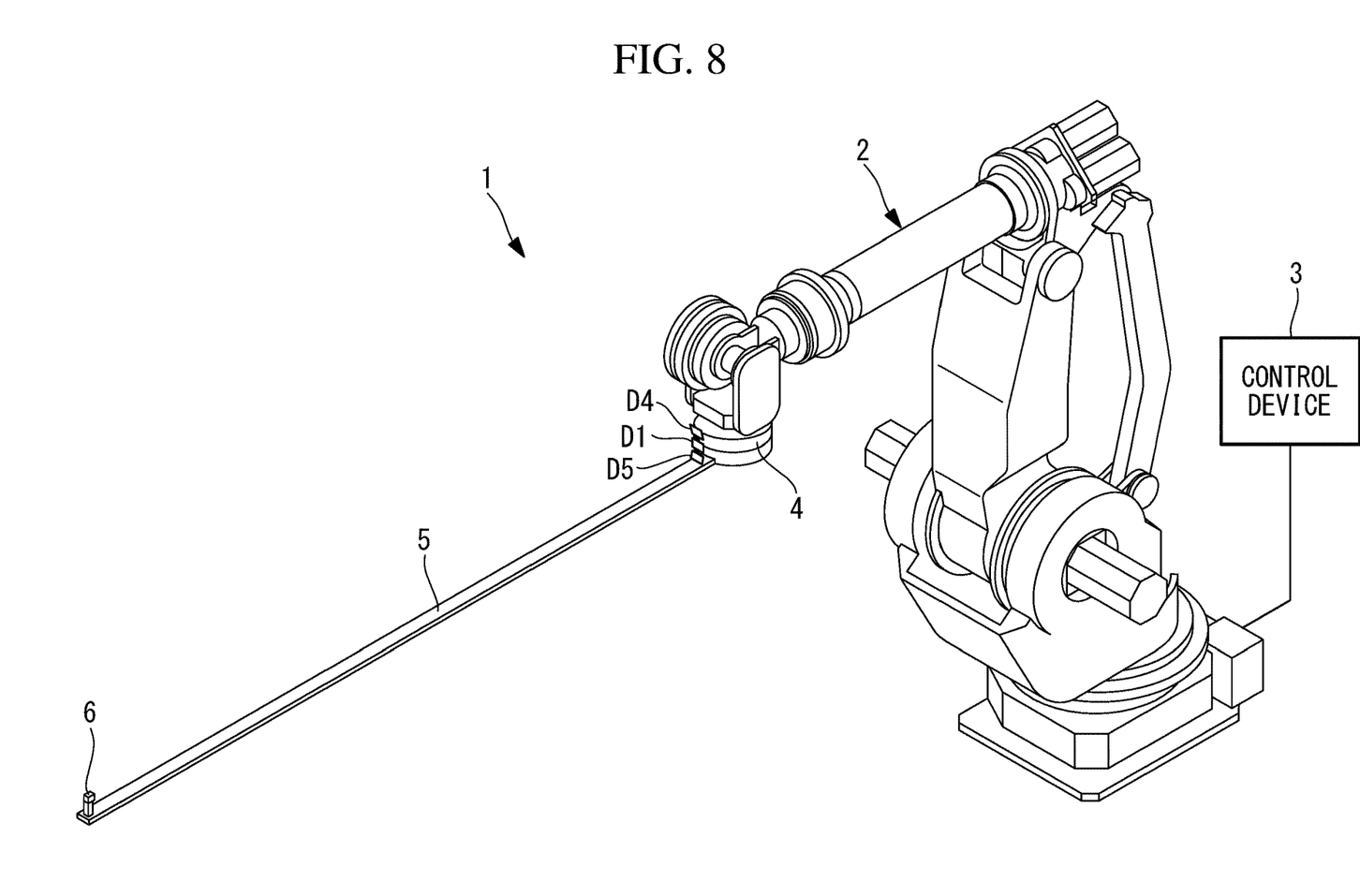
FIG. 8 is an overall configuration diagram showing a first modification of the robot system in FIG. 1.

Additionally, in the present embodiment, a case is described where the three light reception units D1, D2, D3 are arranged in the horizontal direction, and vibration of the distal end of the elongated member 5 in the horizontal direction is suppressed, but this is not restrictive, and as shown in FIG. 8, three light reception units D1, D4, D5 may be arranged in a vertical direction to suppress vibration of the distal end of the elongated member 5 in the vertical direction.

Figure 9:
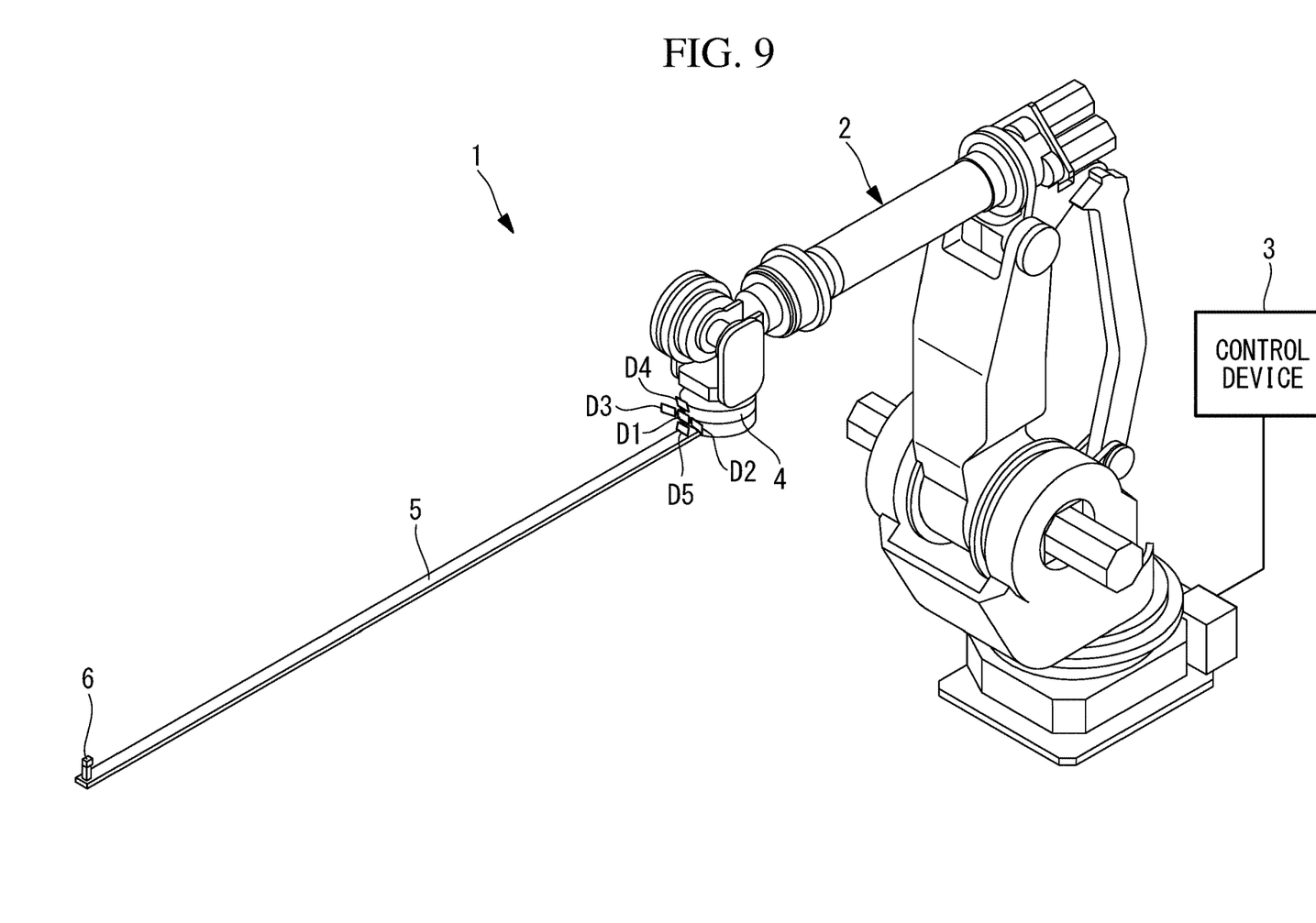
FIG. 9 is an overall configuration diagram showing a second modification of the robot system in FIG. 1.

Moreover, as shown in FIG. 9, three light reception units, among the light reception units D1, D2, D3, D4, D5, may be arranged in both the horizontal direction and the vertical direction to suppress vibration in the horizontal direction and the vertical direction.

Additionally, the arrangement directions of the light reception units D1, D2, D3, D4, D5 are not limited to the horizontal direction and the vertical direction, and arrangement may be in directions intersecting each other at angles other than 90 degrees, or in three or more directions.

Moreover, a case is described above where three light reception units D1, D2, D3 are arranged, but alternatively four or more light reception units may be arranged. Furthermore, two light reception units may be arranged. For example, even if the center light reception unit D1 is not provided, time points of light reception by the two light reception units D2, D3 may be sequentially measured to determine a vibration waveform equivalent to that in FIG. 5, and a cycle and a center of vibration may thereby be calculated.

Furthermore, in the present embodiment, an example is described where the light projection unit 6 is disposed at the distal end of the elongated member 5, and the light reception units D1, D2, D3 are disposed at the proximal end of the elongated member 5, but instead, the light projection unit 6 may be disposed at the proximal end of the elongated member 5, and the light reception units D1, D2, D3 may be disposed at the distal end of the elongated member 5. Furthermore, the light projection unit 6 and the light reception units D1, D2, D3 may be disposed at one end of the elongated member 5, and a reflective member, such as a mirror, may be disposed at the other end of the elongated member 5.

From the above-described embodiments, the following aspects of the present disclosure are derived.

An aspect of the present disclosure provides a robot system including: a robot, a control device configured to control the robot, an elongated member attached to a distal end of the robot, the elongated member having a tool attached to a distal end of the elongated member, a light projection unit attached to one end of the elongated member, for emitting light along a longitudinal direction of the elongated member, a plurality of light reception units arranged at the other end side of the elongated member, in a direction intersecting the longitudinal direction of the elongated member configured to receive the light emitted by the light projection unit, and a timer configured to measure a time necessary for at least one of the plurality of light reception units to receive the light twice, where the control device controls the robot to slightly move a proximal end portion of the elongated member in a movement direction of vibration of a distal end portion of the elongated member, based on the time measured by the timer and an order of light reception by the plurality of light reception units that receive the light in order.

According to the present aspect, if light is emitted by the light projection unit disposed at one end of the elongated member when the elongated member is disposed at a position where vibration is desired to be suppressed, light is received by a light reception unit disposed at the other end side of the elongated member. Because the light reception units are arranged in a direction intersecting the longitudinal direction of the elongated member, if the distal end of the elongated member vibrates in the alignment direction, light emitted by the light projection unit is sequentially received by the plurality of light reception units.

In this case, if the distal end of the elongated member is vibrating in one direction at a predetermined cycle, the cycle of vibration may be estimated by measuring the time that is necessary for one same light reception unit to receive the light twice. For example, in the case where the light reception unit is disposed at a center of vibration, the cycle is twice the time that is necessary to receive the light twice. Even in the case where the light reception unit is not positioned at the center of vibration, the cycle of vibration may be estimated based on the time when light is sequentially received by two or more light reception units.

Accordingly, by measuring, by the timer, the time necessary for one same light reception unit to receive the light twice, a time that is necessary to reach maximum amplitude from the center of vibration, or in other words, a time one-fourth of the cycle, may be estimated.

Furthermore, a direction of displacement caused by vibration of the distal end of the elongated member can be recognized based on the order of light reception by two or more light reception units arranged in a direction of vibration, and thus, a proximal end of the elongated member may be slightly moved in a same direction as the direction of displacement, and energy of vibration due to flexibility of the elongated member may be cancelled and vibration of the distal end of the elongated member may be easily suppressed. That is, according to the present aspect, vibration of the distal end of the elongated member may be easily suppressed, without performing complex calculation such as image processing and calculation of speed.

In the aspect described above, the light reception units may be arranged at three positions including a center position where the light from the light projection unit is received in a state where the elongated member is not vibrating, and positions on both sides of the center position.

Accordingly, when the distal end of the elongated member vibrates, light emitted from the light projection unit periodically reciprocates in the alignment direction of the light reception units with the light reception unit at the center position as the center. Thus, by measuring, by the timer, the time that is necessary for the light reception unit at the center position to receive the light twice, half that time may be easily calculated as the time that is taken to reach the maximum amplitude from the center. Furthermore, the vibration direction may be easily checked based on one of the light reception units on both sides regardless of the direction of vibration from the light reception unit at the center position.

Furthermore, in the aspect described above, the timer may measure a time that is necessary for the light reception unit at the center position to receive the light twice.

Accordingly, by calculating half of the time measured by the timer, the time that is taken to reach the maximum amplitude from the center of vibration may be easily calculated.

Furthermore, in the aspect described above, the timer may start and end measurement of time at a time point when the light is no longer received from a state where the light is received by the light reception unit.

Accordingly, when the distal end of the elongated member is not vibrating, light from the light projection unit is constantly received by the light reception unit at the center position, and thus, occurrence of vibration may be detected at a time point when light is no longer received. In the case where the cycle of vibration is long, it takes a long time for the light to pass the light reception unit, and thus, time may be accurately measured by coinciding start and end of measurement of time with the time points when light is no longer received. Moreover, even in a case where vibration is not sufficiently suppressed by one minute movement, the control device may repeat a vibration suppression operation and sufficiently suppress the vibration as long as a time measurement result is output from the timer.

Furthermore, in the aspect described above, the control device may calculate a first time that is taken to reach maximum amplitude from a center of vibration of the distal end of the elongated member, based on the time measured by the timer, and the control device may control the robot to start the minute movement after a lapse of a difference time obtained by subtracting a second time that should be taken to perform the minute movement from the first time.

Accordingly, the distal end of the elongated member positioned at the center of vibration reaches the maximum amplitude after a lapse of the first time, and the speed becomes zero at the reached position. Furthermore, the second time is necessary to slightly move the proximal end of the elongated member by the robot, and thus, by starting the minute movement of the proximal end of the elongated member after a lapse of the difference time, the minute movement may be ended when the speed of the distal end of the elongated member becomes zero, and vibration of the distal end of the elongated member may be effectively suppressed.

Furthermore, in the aspect described above, the light reception units may be arranged in at least two directions intersecting each other.

Accordingly, vibration of the distal end of the elongated member in a plurality of alignment directions of the light reception units may thereby be detected, and the vibration may be easily suppressed.

According to the aforementioned aspects, an advantageous effect is afforded in that vibration of a distal end of an elongated member may be easily suppressed, without performing complex calculation.

REFERENCE SIGNS LIST 1 robot system
2 robot
3 control device
5 elongated member
6 light projection unit
D1 center light reception unit (light reception unit)
D2 left light reception unit (light reception unit)
D3 right light reception unit (light reception unit)
D4 light reception unit
D5 light reception unit
T1/2 time (first time)
T2 time (second time)
T3 difference time

The invention claimed is:

1. A robot system comprising:
a robot;
a control device configured to control the robot;
an elongated member attached to a distal end of the robot, the elongated member having a tool attached to a distal end of the elongated member;
a light projection unit attached to one end of the elongated member, for emitting light along a longitudinal direction of the elongated member;
a plurality of light reception units arranged at the other end side of the elongated member, in a direction intersecting the longitudinal direction of the elongated member, the light reception units respectively configured to receive the light emitted by the light projection unit;
a timer;
wherein the control device is configured to determine a vibration direction of the distal end of the elongated member based on detection results of the plurality of light reception units;
wherein one of the light reception units continuously detects the light emitted by the light projection unit when the elongated member is not vibrating, and the one of the light reception units does not detect the light emitted by the light projection unit when the distal end of the elongated member is being moved in the vibration direction relative to a proximal end of the elongated member due to vibration of the elongated member;
wherein the timer is configured to measure a non-detection time where the one of the light reception units does not detect the light; and
wherein the control device controls the robot to slightly move the distal end of the robot in the vibration direction based on the non-detection time measured by the timer and the vibration direction determined based on the detection results of the light reception units.

2. The robot system according to claim 1, wherein the light reception units are arranged at three positions including a center position where the light from the light projection unit is received in a state where the elongated member is not vibrating, and positions on both sides of the center position.

3. The robot system according to claim 2, wherein the timer measures a time necessary for the light reception unit at the center position to receive the light twice.

4. The robot system according to claim 2, wherein the timer starts and ends measurement of time at a time point when the light is no longer received from a state where the light is received by the light reception unit.

5. The robot system according to claim 1, wherein:
an operation program to slightly move the distal end of the robot in the vibration direction is stored in the control device;
the control device calculates a first time that corresponds to a quarter of a vibration cycle of the vibration based on the non-detection time measured by the timer;
the operation program is configured to slightly move the distal end of the robot for a second time in the vibration direction; and
the control device is configured to control the robot to start slightly moving the distal end of the robot in the vibration direction after a lapse of a time obtained by subtracting the second time from the first time.

6. The robot system according to claim 1, wherein the light reception units are arranged in at least two directions intersecting each other.

* * * * *